INVENTOR
KENNETH J. STETTEN

BY Thomas J. Davenport
ATTORNEY

United States Patent Office 3,507,551
Patented Apr. 21, 1970

3,507,551
PHOTOCHROMIC DISPLAY SYSTEM
Kenneth J. Stetten, McLean, Va., assignor, by mesne assignments, to Westinghouse Electric Corporation, Pittsburgh, Pa., a corporation of Pennsylvania
Filed June 1, 1965, Ser. No. 460,418
Int. Cl. G02f 1/28
U.S. Cl. 350—160
2 Claims

ABSTRACT OF THE DISCLOSURE

An information display system of the type employing indicia defining transmissivity variations created by radiation induced photochromic reactions wherein a free flowing photochromic liquid is disposed in film form in the path of the radiation and fluid transport means allows flushing out and replenishing of the photochromic liquid film when deterioration of the liquid occurs.

---

This invention relates to display systems employing a photochromic material where excitaton produces information for subsequent or concurrent projection on a screen. More particularly, the invention relates to a photochromic display system employing a flushable, thin film of a photochromic dye in lieu of photochromic vehicles in the form of gels and other quasi-solid preparations.

In certain types of display systems employing screens for viewing information, a photochromic film is employed. An example of the use of such a system employing a photochromic film is shown in copending application Ser. No. 378,603, filed June 29, 1964, by Philip Ring and assigned to the same assignee. From the description which is to follow, it will be apparent, however, that the invention is not limited to the system shown in the above Ring application. In display systems employing photochromic film, it is customary to excite portions or localized areas of the film with light of a particular wave length, as for example, ultra-violet light, and to thereafter image the film, as by projection on a screen. The excited portions of the film turn dark and thus excitation causes a difference in light transmissivity between the excited and the unexcited portions of the film. Such prior systems have generally employed photochromic film in the form of gels, jellies, and other quasi-solid preparations. Such photochromic films are supported by either embedding a photochromic dye in a plastic, or by supporting a quasi-solid preparation thereof on a backing sheet.

As is known to workers in this art, a photochromic film deteriorates with increased usage and a particular piece of film must therefore periodically be changed in the display or projection system. Further, in such prior systems employing the more common photochromic film in a quasi-solid state, there is always the danger of a scratch on the film. Further, the photochromic film, for many applications, must have a coating of an anti-reflecting material on the surface. Still further, some sort of film transport or film holder mechanism must be employed to locate the film relative to the other components of the system. Further, photochromic materials in liquid vehicles are more sensitive to electromagnetic radiation than when the material is placed in a quasi-solid preparation.

According to the present invention, a liquid photochromic dye, synonmously, a phototropic dye or liquid, is employed in lieu of a quasi-solid preparation. Aside from the derivation of the above enumerated advantages to be realized by the use of the dye in the liquid state, it is obvious that the supply mechanism for liquid may be much more compact than many supply mechanisms for the quasi-solid preparations which have been generally employed in the past. It will also be apparent that the novel liquid photochromic dye holder to be described in connection with this invention may be provided with an anti-reflecting coating and therefore only a single anti-reflecting coating may be employed on a component of the projection display system as opposed to the anti-reflecting coating employed in many of the films of prior systems employing quasi-solid preparations.

In general, a photochromic liquid or dye may be defined as one which will exhibit a localized optical inhomogeneity upon exposure to electromagnetic radiation of a certain frequency. Synonomously, such a liquid may be defined as one which will exhibit a localized difference in absorption characteristics of light with regard to one or more wave lengths when excited by electromagnetic radiation of a certain other wave length. To form a liquid photochromic dye, photochromic crystals are placed in a solvent or carrier. The image or portion of different light energy absorption is usually temporary, and the image may be more or less quickly erased by exposure to heat.

Figure 1:
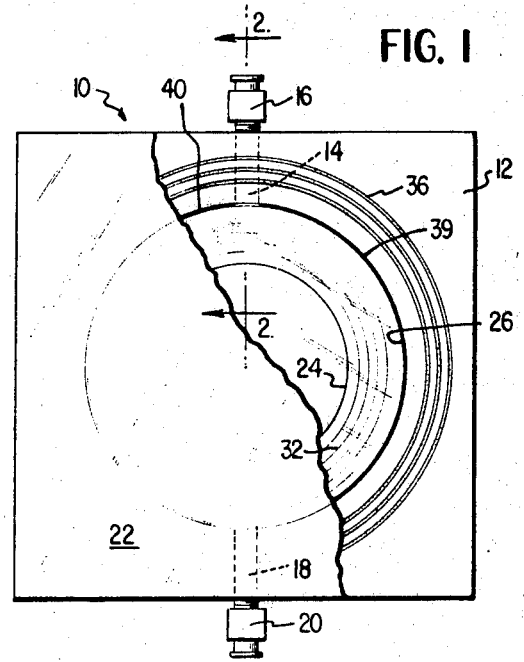
FIGURE 1 is a partially sectioned top plan view of a liquid photochromic dye holder according to this invention.

Referring now to FIGURE 1 of the drawings, the numeral 10 denotes, generally, the liquid photochromic dye holder of this invention and includes a block 12, as of metal or any other suitable material, being generally rectangular in form. The numeral 14 denotes a liquid channel having threaded therein at its upper portion a bushing or fitting 16. The numeral 18 denotes a liquid passageway similar to passageway 14, in the bottom of the holder. The bottom passage 18 is provided with a threaded bushing 20 similar to bushing 16. The numeral 22 denotes a mica or other thin sheet placed over the illustrated face of block 12.

Figure 2:
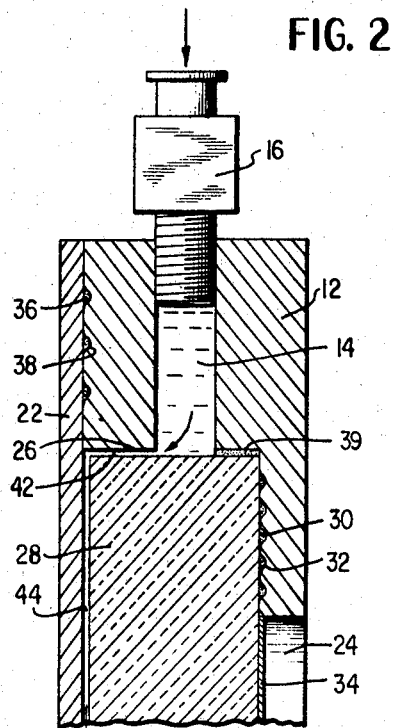
FIGURE 2 is a section taken along line 2—2 of FIGURE 1.

Referring now to FIGURE 2 of the drawings, the numeral 24 denotes a central aperture extending completely through the block 12 and symmetrically located therein. The numeral 26 denotes another circular aperture whose center is coaxial with the centerline of aperture 24, and may be regarded as a countersink in the block 12. A circular glass or other transparent plate 28 is positioned within the aperture 26 with the right portion (viewing FIGURE 2) adhesively affixed to the block 12 by an adhesive denoted by the numeral 30. The adhesive is placed in a series of concentric grooves 32 which extend between the openings 24 and 26 on the block 12. An anti-reflective coating 34 is placed over the glass 28 at the aperture of opening 24 and extends completely thereover. This coating improves contrast by minimizing reflections from the right face of glass 28 whenever the holder 10 is used in a system such as that of FIGURE 3.

The numeral 36 denotes an adhesive placed within another series of concentric grooves or depressions 38, here on the outer left face of block 12. The adhesive 36 is employed to hold mica sheet 22 on the block 12.

The glass 28 is held within block 12 by the adhesive 30 in grooves 32 and by adhesive bands or segments 39 and 40 which extend around the glass 28. By reference to FIGURE 1, it will be observed that bands 39 and 40 are separated at passages 14 and 18. These discontinuities define an upper passageway 42 communicating with passageway 14, with passageway 42 also communicating with liquid cavity 44. Cavity 44 is defined by the space between the mica plate 22 and the left-hand surface (see FIGURE 2) of glass 28. A passage similar to passageway 42 is at the bottom (see FIGURE 1) of the holder 10, with this bottom passageway communicating with passageway 18.

In practice, the thickness of the cavity 44 is of the order of magnitude of $\frac{1}{1000}$ of an inch. A suitable adhesive, which has been found not to be attacked by the liquid photochromic dye, may be purchased on the open market and is denoted by "Hy Sol Epoxy Patch Kit 6–C," marketed by the Hy Sol Corporation of New York.

Figure 3:
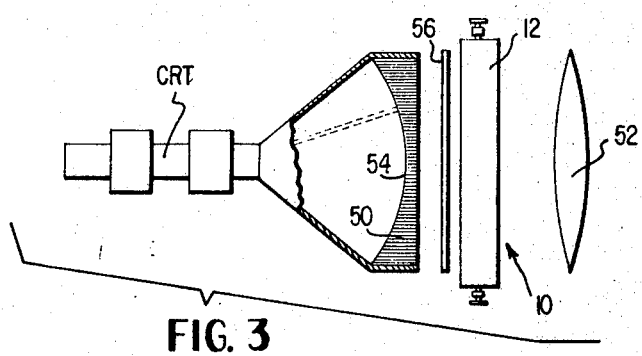
FIGURE 3 is a partially schematic view illustrating the liquid dye holder of FIGURE 1 in a portion of a display system.

Referring now to FIGURE 3 of the drawings, a cathode ray tube, of conventional construction, is denoted by CRT and may include, as in the manner of the above-mentioned Ring system, a plurality of fiber optic bundles, denoted generally by the numeral 50. The liquid holder 10 is placed in front of the face of the CRT and a lens 52 may be located in front of the holder 10. A dichroic plate 56, transmitting ultra-violet and reflecting all visible wave lengths, is placed between the CRT and the holder 10.

Figure 4:
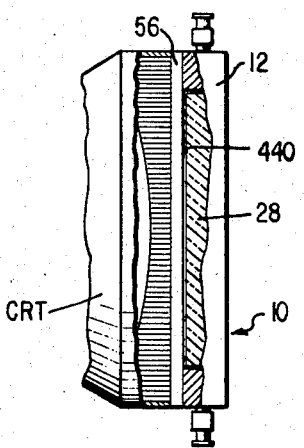
FIGURE 4 is a view similar to FIGURE 3 and shows the liquid dye holder of FIGURE 1 in combination with a portion of a cathode ray tube.

Referring now to FIGURE 4 of the drawings, some display system applications may admit of a direct bonding or affixing of the holder 10 to the face of the dichroic plate 56, with the liquid cavity for the photochromic dye denoted by the numeral 440 and defined by the space between the glass plate 28 and the dichroic plate. In this case, there is no mica sheet 22, the right surface of the plate 56 forming a surface of cavity 440.

In practice, the illustrated sub-combination in an optical display system of FIGURES 3 and 4 may be employed by exciting the photochromic dye in cavity 44 (or cavity 440) with ultra-violet light generated by the phosphor coating 54 on the interior thereof, with the ultra-violet light passing through fiber optic bundle 50. Depending upon the location of the incident electron beam on the phosphor coating 54, it will be observed that selected portions of the cavity 44 will be exposed to ultra-violet radiation and a temporary image formed on the thin liquid film within the cavity 44 due to the action of the ultra-violet light on the photochromic dye. White light, from an external source (not illustrated) passes from right to left in FIGURE 3, through lens 52, through the thin liquid film in cavity 44, to the dichroic plate, thence back through the thin liquid film in cavity 44, back through the lens 52 for imaging, by suitable arrangement, at a screen. The electron beam rapidly sweeps over the phosphor coating, tracing out whatever indicia or information it is desired to display on the screen. This is done by conventional video circuitry controls associated with the cathode ray tube.

Any suitable form of supply of the liquid photochromic dye may be employed for flow into bushing 16 and out of bushing 20, the flow being through passageway 14, through passageway 42, thence through cavity 44, thence through the cavity in the lower portion of the holder 10 corresponding to passageway 42 of FIGURE 2, and thence through passageway 18 to bushing 20. A charge of the photochromic dye is injected into the holder 10 and used until continued usage causes deterioration, at which time a flushing process occurs with the now deteriorated dye being flushed out and a new charge being placed in the holder. If desired, a plurality of inlets 14 and outlets 18 may be employed to facilitate flushing.

Figure 5:
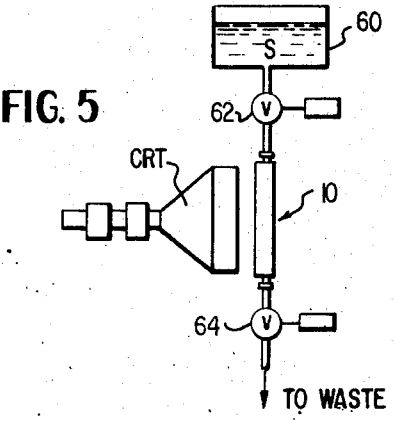
FIGURE 5 is a schematic view of a flushing system for injecting a fresh charge of photochromic dye into the holder of FIGURES 1 to 4.

FIGURE 5 illustrates one form of a flushing system. A pressurized container 60 carries a supply S of fresh photochromic dye. Flow lines couple the supply, through solenoid valves 62 and 64, with the holder 10. In operation, valves 62 and 64 are opened, allowing the used dye to flow to waste and a fresh charge to enter cavity 44 in the holder 10, at which time the valves are closed until flushing is again required. In order to test the completeness of the flushing action, the display system may be energized, but without a signal being supplied by the CRT, and the absence of any image on the display viewing screen will indicate completely fresh dye in the holder.

In practice, an actual embodiment of the invention was made with a metal plate 3 inches on a side and approximately ¼ of an inch thick. The photochromic dye, in the liquid state, was purchased on the open market, the precise composition thereof forming no part of this invention. Further with regard to the actual practice of the invention, it has been found feasible to employ, in lieu of a separate dichroic plate 56 as illustrated, a thin film coating a few wavelengths of light thick, directly deposited on the fiber optic faceplate, i.e., the right face of 50 as viewed in FIGURE 3. Alternatively, a dichroic film approximately .001 inch thick on a thin mica piece serves as the dichroic plate. Such films are generally deposited by a vacuum process, the precise nature of which is known to workers in this art.

Another useful technique which has evolved from actual practice is the deliberate variation of the viscosity of the photochromic liquid until Brownian, i.e., random, motion of its molecules is so lessened that the motion does not affect the final, projected image. Also, random thermal currents, i.e., an eddy type motion, due to slight temperature gradients over the thin liquid film, may cause blurring of the projected image. An immersion oil, such as Cargille's Type A non-drying immersion oil, is mixed with a saturated solution of the photochromic liquid in a volumetric ratio of fifty (immersion oil) to one (liquid dye).

As is well known to workers in this art, the difference in cost between photochromic film and photochromic dye or photochromic liquid is quite appreciable, and aside from the benefits before mentioned, a great economy in operation may be realized by the practice of this invention.

What is claimed is:

1. An information display system comprising, in combination; a holder having a first aperture extending completely therethrough, a second aperture coaxial with said first aperture and extending partially through said holder from one face thereof towards an opposite face thereof, an inlet passage and an outlet passage each extending from the interior surface of said second aperture to exterior portions of said holder, a first transparent element positioned within said second aperture, a second transparent element covering the juncture of said second aperture and an external surface of said holder, first seal means adjacent the juncture of said first transparent element with said first aperture, second seal means at the juncture of said second transparent element with said holder, thereby defining a fluid cavity to carry a liquid photochromic dye within said holder, a portion of the cavity being positioned between said transparent elements and in communication with said inlet and outlet passages, means for producing indicia related radiation incident upon said cavity, and fluid transport means connected to said inlet and outlet passages for displacing and replacing a liquid in said cavity.

2. An information display system of the type employing indicia defining transmissivity variations created by radiation induced photochromic reactions, said system comprising, a free flowing photochromic liquid, a source of indicia related radiation creating transmissivity variation within said liquid, a holder including a first aperture extending completely therethrough, a second aperture coaxial with said first aperture and extending partially through said holder from one face thereof towards an opposite face thereof, an inlet passage and an outlet passage each extending from the interior surface of said second aperture to exterior portions of said holder, a first transparent element positioned within said second aperture, a second transparent element covering the junction of said second aperture and an external surface of said holder, first seal means adjacent the juncture of said first transparent element with said first aperture, second seal means at the juncture of said second transparent element with said holder, thereby defining a fluid cavity within said holder for carrying a displaceable thin film of said liquid spatially oriented in the path of said radiation, and fluid transport means for displacing and replacing said film, whereby static problems of solid and quasi solid photochromic systems are obviated.

References Cited

UNITED STATES PATENTS

| | | | |
|---|---|---|---|
| 2,515,406 | 7/1950 | Howard | 350—312 |
| 2,783,682 | 3/1957 | Swenson | 350—312 |
| 2,969,474 | 1/1961 | Roberts et al. | 313—92 |
| 3,366,480 | 1/1968 | Gaynor et al. | |

JEWELL H. PEDERSEN, Primary Examiner

W. L. SIKES, Assistant Examiner

U.S. Cl. X.R.

178—7.5, 7.85